(12) United States Patent
Tao

(10) Patent No.: US 6,497,735 B2
(45) Date of Patent: *Dec. 24, 2002

(54) VEGETABLE LIPID-BASED COMPOSITION AND CANDLE

(75) Inventor: Bernard Y. Tao, Lafayette, IN (US)

(73) Assignee: Indiana Soybean Board, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/802,137

(22) Filed: Mar. 8, 2001

(65) Prior Publication Data

US 2001/0013195 A1 Aug. 16, 2001

Related U.S. Application Data

(63) Continuation of application No. 09/132,991, filed on Aug. 12, 1998, now Pat. No. 6,284,007.

(51) Int. Cl.$^7$ .............................. C10L 5/00; C11C 5/00
(52) U.S. Cl. ........................................ 44/275; 431/288
(58) Field of Search ............................. 44/275; 431/288

(56) References Cited

U.S. PATENT DOCUMENTS

| | | |
|---|---|---|
| 1,958,462 A | 5/1934 | Baumer |
| 1,954,659 A | 10/1934 | Will |
| 2,377,106 A | 5/1945 | Reswick |
| 2,638,411 A | 5/1953 | Thompson et al. |
| 3,429,815 A | 2/1969 | Drake |
| 3,613,658 A | 10/1971 | Knowles et al. |
| 3,630,697 A | 12/1971 | Dulling et al. |
| 3,645,705 A | 2/1972 | Miller et al. |
| 3,843,312 A | 10/1974 | Easterday |
| 3,844,706 A | * 10/1974 | Tsaras ..................... 431/288 |
| 3,871,815 A | 3/1975 | Cangardel |
| 4,002,706 A | 1/1977 | Pretorius |
| 4,118,203 A | 10/1978 | Beardmore et al. |
| 4,134,718 A | 1/1979 | Kayfetz et al. |
| 4,390,590 A | 6/1983 | Saunders et al. |
| 4,507,077 A | 3/1985 | Sapper |
| 4,608,011 A | 8/1986 | Comstock |
| 4,614,625 A | 9/1986 | Wilson |
| 4,693,890 A | 9/1987 | Wilson et al. |
| 4,759,709 A | 7/1988 | Luken, Jr. et al. |
| 4,813,975 A | 3/1989 | Poulina et al. |
| 4,842,648 A | 6/1989 | Phadoemchit et al. |
| 4,855,098 A | 8/1989 | Taylor |
| 5,171,329 A | 12/1992 | Lin |
| 5,578,089 A | 11/1996 | Elsamaloty |
| 5,879,694 A | 3/1999 | Morrison et al. |
| 5,919,423 A | 7/1999 | Requejo et al. |

FOREIGN PATENT DOCUMENTS

| | | |
|---|---|---|
| GB | 1015354 | 12/1965 |
| GB | 2197337 A | 5/1988 |
| IL | 109814 | * 6/1996 |
| JP | 72030760 | 4/1968 |
| JP | 47-30760 | 8/1972 |
| JP | 60051765 | 3/1985 |

OTHER PUBLICATIONS

Kirk–Other, Encyclopedia of Chemical Technology, 3$^{rd}$ Edition, vol. 24, pp. 473–476, Date Unknown.
Author Unknown, Refinery Processes, vol. 18, pp. 458–461.

* cited by examiner

Primary Examiner—Cephia D. Toomer
(74) Attorney, Agent, or Firm—Bose McKinney & Evans LLP

(57) ABSTRACT

A vegetable lipid-based composition which includes a triglyceride or a free fatty acid/triglyceride mixture. The vegetable lipid-based composition has properties that make it advantageous in candle production.

54 Claims, No Drawings

VEGETABLE LIPID-BASED COMPOSITION AND CANDLE

This is a continuation of application Ser. No. 09/132,991 filed Aug. 12, 1998, now U.S. Pat. No. 6,284,007.

This invention relates to vegetable lipid-based compositions that are advantageous to candle production. More specifically, the invention relates to a vegetable-lipid based composition including a vegetable lipid component and a petroleum wax wherein the composition contains a greater concentration of the vegetable lipid component than the petroleum wax. The vegetable lipid component includes either a triglyceride or a free fatty acid/triglyceride mixture.

BACKGROUND OF THE INVENTION

Candles have long been used for light as well as for ceremonies and rituals. These candles are typically manufactured from compositions containing solid animal fats and waxes. Suitable waxes include petroleum waxes such as medium paraffin wax and microcrystalline paraffin wax that are derived from petroleum refining processes. The petroleum wax component of these candles is usually present in greater amounts than the solid animal fats.

Candles made from petroleum waxes produce a black smoke upon burning and generally exhibit an unpleasant odor. The black smoke of petroleum-based candles contains polycyclic aromatic hydrocarbons, metals, and sulfur compounds that may be carcinogenic and/or toxic. Burning these candles in an enclosed environment increases the concentrations of these compounds and could therefore increase the detrimental effects that they may have.

Moreover, the cost of the petroleum wax will likely increase due to its low supply and increasing demand. Petroleum refining processes are constantly being improved to maximize quantities of short chain hydrocarbons and aromatic chemicals and the production of petroleum waxes is being reduced.

In this regard, candles are known that contain greater amounts of butter oil than conventional candles; however, compositions used to make these candles typically contain other ingredients, such as emulsifiers. These extra ingredients add to the complexity of the mixture and generally increase the cost of the candle.

As a result, there is a need for a candle composition that minimizes the risk to human health upon burning, utilizes renewable resources while minimizing or eliminating use of petrochemical-derived products, and has a naturally pleasing odor that does not require additional fragrances. This invention addresses that need.

SUMMARY OF THE INVENTION

The present invention provides a vegetable lipid-based composition having properties advantageous for candle production. The vegetable lipid-based composition includes a vegetable lipid component and a petroleum wax. The vegetable lipid component may be a triglyceride or a free fatty acid/triglceyride mixture. The composition preferably includes a greater concentration of the triglyceride or free fatty acid/triglyceride mixture than the petroleum wax.

In one preferred embodiment, the vegetable lipid-based composition includes about 51% by weight to about 100% by weight of the triglyceride or fatty acid/triglyceride mixture and up to about 49% by weight of the petroleum wax, wherein the free fatty acid/triglyceride mixture includes about 1% by weight to about 99% by weight of the free fatty acid and about 1% by weight to about 99% by weight of the triglyceride. The petroleum wax may include a medium paraffin wax, a microcrystalline paraffin wax or a petroleum wax obtained from crude oil refined to other degrees.

In another embodiment, the vegetable lipid-based composition includes about 83% by weight to about 100% by weight of the triglyceride or the fatty acid/triglyceride mixture and up to about 17% by weight of the petroleum wax, wherein the fatty acid/triglyceride mixture includes about 1% by weight to about 99% by weight of the free fatty acid and about 1% by weight to about 99% by weight of the triglyceride.

In yet another embodiment, the vegetable lipid composition includes only the vegetable lipid component and the petroleum wax. In other embodiments, other components may be added to the composition, including colorants and odorants.

The present invention also provides a candle formed from the vegetable lipid-based compositions.

Accordingly, one object of the invention is to provide a vegetable lipid-based composition, and candles produced with such compositions that, when burned, minimizes the risk to human health, utilizes renewable resources, minimizes or eliminates the use of petrochemical-derived products and has a naturally pleasing odor.

Other objects and advantages of the present invention will be apparent after reading the following description.

DESCRIPTION OF THE PREFERRED EMBODIMENT

For the purpose of promoting an understanding of the principles of the invention, reference will now be made to certain embodiments thereof and specific language will be used to describe the same. It will nevertheless be understood that no limitation of the scope of the invention is thereby intended, such alterations, modifications and further applications of the principles of the invention illustrated herein being contemplated as would normally occur to one skilled in the art to which the invention relates.

The present invention provides a vegetable lipid-based composition and a candle formed therefrom. The composition includes a vegetable lipid component, including a triglyceride or a free fatty acid/triglyceride mixture, and a petroleum wax. The vegetable lipid component of the composition is preferably present in the composition in a greater concentration by weight than the petroleum wax component.

As known in the art, triglycerides are fatty acid esters of glycerol. As used herein, the term "free fatty acid" will refer to a fatty acid that is not covalently bound through an ester linkage to glycerol. Additionally, as used herein, the term "fatty acid component" will be used to describe a fatty acid that is covalently bound through an ester linkage to glycerol.

The triglycerides and free fatty acids are obtained preferably from plant sources, including soybean, cottonseed, corn, sunflower, canola and palm oils. The triglycerides are used after normal refining processing by methods known in the art. For example, plant triglycerides may be obtained by solvent extraction of plant biomass using aliphatic solvents. Subsequent additional purification may involve distillation, fractional crystallization, degumming, bleaching and steam stripping. The triglycerides are also partially or fully hydrogenated. Furthermore, fatty acids may be obtained by hydrolysis of natural triglycerides (e.g., alkaline hydrolysis followed by purification methods known in the art, including distillation and steam stripping) or by synthesis from petrochemical fatty alcohols. The free fatty acids and triglycerides may further be obtained from commercial sources, including Cargill, Archer Daniels Midlands and Central Soya.

The free fatty acids and fatty acid components of the triglycerides are preferably saturated and their chains exhibit varying length. However, the free fatty acids and fatty acid components of the triglycerides may be unsaturated as long as the final candle composition will be a solid at the temperature at which the candle is used. The properties of the free fatty acid/triglyceride mixture, such as melting point, will vary as a function of the chain length and degree of saturation of the free fatty acids and the fatty acid components of the triglycerides. For example, as the degree of saturation decreases, the melting point decreases. Similarly, as the chain length of the fatty acids decreases, the melting point decreases. Preferred free fatty acids are the saturated fatty acids such as palmitic acid and include saturated fatty acids of longer carbon chain length, such as arachidic acid and behenic acid. Stearic acid is further preferred.

Table 1 depicts the preferred fatty acid components of the triglycerides in the present invention along with their preferred maximum percentages by weight.

TABLE 1

Fatty Acid Composition Ranges of Triglycerides in Vegetable Lipid-Based Compositions

| Fatty Acid Chain Length* | Weight Percent |
| --- | --- |
| 12:0 | 0.21 |
| 14:0 | 0.77 |
| 16:0 | 39.28 |
| 18:0 | 74.22 |
| 20:0 | 0.19 |
| 22:0 | 0.064 |
| 16:1 | 0.28 |
| 18:1 | 72.82 |
| 20:1 | 1.035 |
| 18:2 | 33.91 |
| 18:3 | 4.97 |

*number of carbon atoms:number of double bonds (e.g., 18:2 refers to linoleic acid)

As seen in Table 1, when unsaturated, the fatty acid components preferably contain about 1 to about 3 double bonds. The preferred chain length of the fatty acid components ranges from about 12 to about 22 carbon atoms. The preferred fatty acid components of the triglycerides include palmitic acid (16:0), stearic acid (18:0), oleic acid (18:1), arachidic acid (20:0) and behenic acid (22:0). For example, in one embodiment of the invention as seen in Table 1, the triglyceride component of the composition preferably contains up to about 74% by weight of the 18 carbon, saturated fatty acid component stearic acid. In another embodiment, the triglyceride preferably contains up to about 73% of the monounsaturated 18 carbon fatty acid component oleic acid. In yet a further embodiment, the triglyceride contains up to about 39% of the fatty acid component palmitic acid.

The vegetable lipid-based composition may include about 51% by weight to about 100% by weight of the vegetable lipid component including a free fatty acid/triglyceride mixture with the remainder including petroleum wax. Moreover, the vegetable lipid component may include only a triglyceride. However, the vegetable lipid-based composition preferably includes about 55% to about 100%, about 65% to about 100%, about 75% to about 100% and, more preferably, about 83% by weight to about 100% by weight of the vegetable lipid component. The free fatty acid/triglyceride mixture includes, on a weight percentage basis, about 1% to about 99% of the free fatty acid and about 1% to about 99% of the triglyceride but preferably includes about 1% to about 75% of the free fatty acid and about 25% to about 99% of the triglcyeride, about 1% to about 50% of the free fatty acid and about 50% to about 99% of the triglyceride, and about 1% to about 25% of the free fatty acid and about 75% to about 99% of the triglyceride. Further preferred free fatty acid/triglyceride mixtures include about 5% to about 95% of the free fatty acid and about 5% to about 95% of the triglyceride, about 5% to about 75% of the free fatty acid and about 25% to about 95% of the triglcyeride, about 5% to about 50% of the free fatty acid and about 50% to about 95% of the triglyceride, and about 5% to about 25% of the free fatty acid and about 75% to about 95% of the triglyceride. Even more specifically, superior candle quality may also be achieved when the free fatty acid/triglyceride mixture includes at least about 5% free fatty acids and about 95% triglycerides. For example, a preferred vegetable lipid composition includes about 5% by weight stearic acid and 95% by weight triglycerides having the following fatty acid components: about 17.2% palmitic acid, about 38.4% stearic acid and about 44.4% oleic acid, all on a weight-percent basis.

The petroleum wax of the present invention is a by-product of the petroleum refining process and may be obtained commercially from suppliers such as Witco. The quality and quantity of the wax obtained from the refining process is dependent upon the source of the crude oil and the extent of the refining. The petroleum wax component of the vegetable lipid-based candle composition includes, for example, a paraffin wax, including medium paraffin wax, microcrystalline paraffin wax or a combination thereof. However, petroleum wax obtained from crude oil refined to other degrees may also be used in the invention.

Although the exact chemical compositions of these waxes are not known as the nature of these by-products vary from one distillation process to the next, these waxes are composed of various types of hydrocarbons. For example, medium paraffin wax is composed primarily of straight chain hydrocarbons having carbon chain lengths ranging from about 20 to about 40, with the remainder typically comprising isoalkanes and cycloalkanes. The melting point of medium paraffin wax is about 50° C. to about 65° C. Microcrystalline paraffin wax is composed of branched and cyclic hydrocarbons having carbon chain lengths of about 30 to about 100 and the melting point of the wax is about 75° C. to about 85° C. Further descriptions of the petroleum wax that may be used in the invention may be found in Kirk-Othmer, *Encyclopedia of Chemical Technology*, 3rd Edition, Volume 24, pages 473–76, which is hereby incorporated by reference.

The vegetable lipid-based composition may contain up to about 49% by weight of the petroleum wax but preferably contains up to about 45%, up to about 35%, up to about 25% and more preferably up to about 17% by weight of the petroleum wax with the remainder being the vegetable lipid component. For example, the vegetable lipid-based composition may contain up to about 17% by weight medium paraffin wax. In general, superior candle quality is achieved when the vegetable lipid-based composition contains a greater concentration of the vegetable lipid component than the petroleum wax component. Moreover, even though a vegetable lipid-based composition including up to about 49% by weight of a petroleum wax will function as a suitable candle, superior candle quality may be achieved when the petroleum wax component is minimized. It is preferred that the vegetable lipid-based composition includes at least about 3% by weight of the petroleum wax component.

In a preferred embodiment, the vegetable lipid-based composition only includes the vegetable lipid component and petroleum wax. However, various odorants or colorants may be added to the vegetable lipid-based composition as desired. U.S. Pat. No. 4,608,011, issued to Comstock on Aug. 26, 1986, lists several odorants and colorants which may preferably be added to the vegetable lipid-based composition and is hereby incorporated by reference in its entirety. Furthermore, color stabilizing additives, such as ultraviolet light absorbing materials, may be added to prevent pigment color fading.

The vegetable lipid-based composition of the present invention may also include a very low level of an antioxidant, such as about 1 ppm to about 10 ppm of t-butylhydroquinone (TBHQ) or butylated hydroxytoluene (BHT), to increase shelf life. Sodium ethylenediaminetetraacetic acid may be used in synergistic combination with the TBHQ and/or BHT for metal chelation.

The present invention also provides a candle formed from the vegetable lipid-based composition. The candle can be of any size and shape desired. The candle preferably includes a wick which typically extends longitudinally from one end of the candle to the other end. The wick is preferably made from woven cotton or any other suitable material as known in the art. The candle is preferably placed in a candle holder which is preferably composed of glass or any heat resistant material.

The candles formed from the vegetable lipid-based compositions of the present invention have superior solids content/mechanical stability as compared to commercial paraffin candles at elevated temperatures. For example, when paraffin candles and the vegetable lipid-based candles of the present invention are stored overnight at 55° C., the paraffin candles liquify whereas the vegetable lipid-based candles remain solid (as determined by their ability to support a 4 gram marble on their surface). Although the vegetable lipid-based candles begin to soften when stored at 59° C., the candles remain solid. Furthermore, soot and smoke formation was subjectively judged to be lower when candles including a vegetable lipid-based composition were burned compared to paraffin wax-based candles under the same conditions. Additionally, combustion tests described in Example 6 show that candles including a vegetable lipid-based composition of the present invention burn approximately 80% longer than paraffin wax-based candles under identical conditions. Therefore, a candle including a vegetable lipid-based composition will last significantly longer than a paraffin wax-based candle.

The crystallization/solidification behavior of the vegetable lipid-based composition of the present invention is significantly different than the behavior of petrochemical products. It is therefore necessary to employ relatively slow process cooling rates in order to obtain smooth candles with no visible crystal formation.

Reference will now be made to specific examples using the compositions and processes above described. All percentages are by weight. It is to be understood that the examples are provided to more completely describe preferred embodiments and that no limitation to the scope of the invention is intended thereby. The following preparatory steps were employed in the Examples.

The components of the candle were weighed and combined in a clean glass container. The composite material was obtained by heating to melt all solid components to a liquid state with sufficient stirring to uniformly mix all components. The temperature range for melting was normally between approximately 75° C. to about 110° C. Although they are not necessary for the mixing process, higher temperatures may be used. Temperatures in excess of 130° C. are to be avoided to minimize degradation of the materials.

After the components were mixed, the composite material was either directly poured into product containers or was allowed to cool at room temperature to approximately 85° C. before being poured into product containers. A wick was normally added at this point, while the material is still in the liquid state. The product was then cooled by standing at ambient temperature (room temperature), by the use of air convection (fan) or by the use of a temperature controlled water bath in a temperature range of about 5° C. to about 50° C. Colder temperatures may also be used if faster cooling is desired. Although several different cooling processes may be used, superior candles were made by minimizing the pouring temperature and cooling rapidly using air convection or a water bath.

EXAMPLE 1

A 100% triglyceride lipid candle was prepared in accordance with the described protocol. The fatty acid components of the triglyceride were 13.7% palmitic acid, 74.2% stearic acid and 12.1% oleic acid.

EXAMPLE 2

A candle having 96% triglycerides and 4% microcrystalline wax was prepared in accordance with the described protocol. The fatty acid components of the triglyceride were 22.4% palmitic acid, 45.7% stearic acid, 28.9% oleic acid and 3.9% by weight linoleic acid.

EXAMPLE 3

A candle containing an 83% by weight fatty acid/triglyceride mixture and 17% by weight microcrystalline paraffin wax was prepared in accordance with the described protocol. Microcrystalline paraffin wax with a melting point of 79° C. and containing branched and cyclic hydrocarbons of carbon chain length of about 30 to about 100 was added to a fatty acid/triglyceride mixture having 6% free fatty acids and 94% triglyceride wherein the free fatty acid component was stearic acid. The fatty acid components of the triglyceride were 29.0% palmitic acid, 68.8% stearic acid and 2.1% by weight oleic acid.

EXAMPLE 4

A candle containing 96% triglycerides and 4% medium paraffin wax was prepared in accordance with the described protocol. Medium paraffin wax with a melting point of about 65° C. and containing predominantly straight chain hydrocarbons of carbon chain length of about 22 to about 36 was added to a triglyceride having the following fatty acid components: 18.0% palmitic acid, 35.2% stearic acid and 46.8% by weight oleic acid.

EXAMPLE 5

In another example, a vegetable lipid-based candle is made following the protocol described above wherein the vegetable lipid-based composition of the candle includes only a vegetable lipid and a petroleum wax. Specifically, the composition includes about 51% by weight to about 100% by weight of the fatty acid/triglyceride mixture and up to about 49% by weight of the petroleum wax component. The petroleum wax component is optionally a medium paraffin wax, a microcrystalline paraffin wax or a petroleum wax obtained from crude oil refined to other degrees. The fatty acid/triglyceride mixture can include about 1% by weight to about 99% by weight of the free fatty acid and about 1% by weight to about 99% by weight of the triglyceride. The fatty acid components of the triglyceride and the maximum respective percentages by weight that they may be found in the triglyceride may be those detailed in Table 1. The free fatty acids present in the fatty acid/triglyceride mixture can be, for example, palmitic, stearic, behenic, arachidic, oleic or linoleic acid or any combination thereof. Other saturated or unsaturated free fatty acids may be included as the sole free fatty acids or in combination with other free fatty acids as long as the candle will be a solid at the temperature at which it is used. In other examples, the composition may include other components, such as colorants or odorants.

EXAMPLE 6

Combustion tests were performed to compare the vegetable lipid-based candles of the present invention with commercial paraffin candles. An electronic scale was placed on a table and a 4-wall baffle (10"×10"×10") (25.4 cm×25.4 cm×25.4 cm) with the top and bottom surface open was suspended 3.5 in (8.9 cm) above the table surface to allow free access for airflow below and above. The purpose of the baffle was to minimize uncontrolled drafts and air convection. The electronic scale was positioned in the baffle area at a distance from the base of the baffle of approximately one-third the baffle height. Candles of the following composition were placed on the scale: paraffin candles composed of 150 g of 100% medium paraffin wax and vegetable lipid-based candles containing 4% microcrystalline paraffin wax and 96% triglycerides having the following fatty acid components: 22.4% palmitic acid, 45.7% stearic acid, 28.9% oleic acid and 3.9% by weight linoleic acid. The experiment was run in duplicate for each candle composition. All candles had identical wicks and were present in identical containers.

The candles were burned for two hours and the mass loss rate was recorded. No significant variations in air composition or temperature occurred during the test period as the room was well-ventilated. The measured mass loss rates for the paraffin candles were 7.13 g/hour and 7.08 g/hour. The measured mass loss rates for the vegetable lipid-based candles were 3.72 g/hour and 4.10 g/hour. Therefore, the vegetable lipid-based candles will burn approximately 80% longer than commercial paraffin candles.

While the invention has been illustrated and described in detail in the foregoing description, the same is to be construed as illustrative and not restrictive in character, it being understood that only the preferred embodiment has been shown and described and that all changes and modifications that come within the spirit of the invention are desired to be protected.

What is claimed is:

1. A candle comprising a wick and a combustible candle composition comprising a vegetable based composition and at least 3% by weight of at least one petroleum wax, wherein the vegetable based composition comprises 5%–95% by weight free fatty acid and 5%–95% by weight triglycerides.

2. The candle of claim 1, wherein the combustible candle composition further comprises at least one additive selected from the group consisting of: an odorant, a colorant, a color stabilizing additive and an antioxidant.

3. A candle comprising a wick and a combustible candle composition comprising 5%–95% by weight free fatty acid and 5%–95% by weight vegetable-derived triglycerides, the vegetable-derived triglycerides comprising 74.2% by weight stearic acid, the combustible candle composition being solid at a temperature up to 55° C.

4. The candle of claim 3, wherein the combustible candle composition further comprises at least one additive selected from the group consisting of: an odorant, a colorant, a color stabilizing additive and an antioxidant.

5. A candle comprising a wick and a combustible candle composition comprising 0–17% by weight of at least one petroleum wax and 83%–100% by weight of a vegetable-based composition, the vegetable based composition including vegetable-derived triglycerides consisting essentially of fatty acid components having up to 3 double bonds, the combustible candle composition being solid at a temperature up to 55° C.

6. The candle of claim 5, wherein the vegetable-based composition comprises 5%–95% by weight free fatty acid and 5%–95% by weight vegetable-derived triglycerides.

7. The candle of claim 5, wherein the vegetable-based composition comprises 1%–50% by weight free fatty acid and 50%–99% by weight vegetable-derived triglycerides consisting essentially of saturated fatty acid components.

8. The candle of claim 5, wherein the vegetable-based composition comprises 5%–75% by weight free fatty acid and 25%–95% by weight vegetable-derived triglycerides consisting essentially of saturated fatty acid components.

9. The candle of claim 5, wherein the vegetable-based composition comprises 5%–50% by weight free fatty acid and 50%–95% by weight vegetable-derived triglycerides consisting essentially of saturated fatty acid components.

10. The candle of claim 5, wherein the vegetable-based composition comprises 5%–25% by weight free fatty acid and 75%–95% by weight vegetable-derived triglycerides comprising up to 74.2% by weight stearic acid.

11. The candle of claim 5, wherein the vegetable-based composition comprises 5% by weight free fatty acid and 95% by weight vegetable-derived triglycerides comprising 38.4% by weight stearic acid.

12. The candle of claim 5, further comprising at least one additive selected from the group consisting of: an odorant, a colorant, a color stabilizing additive and an antioxidant.

13. The candle of claim 5, comprising at least 3% by weight of the at least one petroleum wax.

14. A candle comprising a wick and a combustible candle composition comprising 5%–75% by weight free fatty acid and 25%–95% by weight vegetable-derived triglycerides consisting essentially of fatty acid components having up to 3 double bonds, the combustible candle composition being solid at a temperature up to 55° C.

15. The candle of claim 14, wherein the combustible candle composition further comprises at least one additive selected from the group consisting of: an odorant, a colorant, a color stabilizing additive and an antioxidant.

16. A candle comprising a wick and a combustible candle composition comprising 5%–75% by weight stearic acid and 25%–95% by weight vegetable-derived triglycerides consisting essentially of saturated free fatty acid components, wherein the combustible candle composition further comprises an odorant and an antioxidant, and wherein the combustible candle composition further comprises at least 3% by weight of at least one petroleum wax.

17. The candle of claim 16, wherein the at least one petroleum wax includes a paraffin wax.

18. The candle of claim 13, wherein the at least one petroleum wax includes a paraffin wax.

19. The candle of claim 5, wherein the at least one petroleum wax includes a paraffin wax.

20. The candle of claim 1, wherein the at least one petroleum wax includes a paraffin wax.

21. A candle comprising a wick and a combustible candle composition comprising 51% to 100% by weight of a plant derived composition, the plant derived composition including a mixture of free fatty acid and fatty acid esters of glycerol, the mixture including 1% to 99% by weight of free fatty acid and 1% to 99% by weight of fatty acid esters of glycerol, the fatty acid esters of glycerol consisting essentially of fatty acid components having up to 3 double bonds, the combustible candle composition being solid at a temperature up to 55° C.

22. The candle of claim 21, wherein the composition further comprises at least one petroleum wax.

23. The candle of claim 21, wherein the composition comprises at least 55% by weight of the mixture of free fatty acid and fatty acid esters of glycerol.

24. The candle of claim 21, wherein the composition comprises at least 65% by weight of the mixture of free fatty acid and fatty acid esters of glycerol.

25. The candle of claim 21, wherein the composition comprises at least 75% by weight of the mixture of free fatty acid and fatty acid esters of glycerol.

26. The candle of claim 21, wherein the composition comprises at least 83% by weight of the mixture of free fatty acid and fatty acid esters of glycerol.

27. The candle of claim 21, wherein the mixture includes 1% to 99% by weight of free fatty acid and 1% to 99% by weight of triglycerides, the triglycerides being derived from soybean.

28. The candle of claim 21, wherein the mixture includes 1% to 75% by weight of free fatty acid and 25% to 99% by weight of fatty acid esters of glycerol.

29. The candle of claim 21, wherein the mixture includes 1% to 50% by weight of free fatty acid and 50% to 99% by weight of fatty acid esters of glycerol.

30. The candle of claim 21, wherein the mixture includes 1% to 25% by weight of free fatty acid and 75% to 99% by weight of fatty acid esters of glycerol.

31. The candle of claim 21, wherein the mixture includes 5% to 95% by weight of free fatty acid and 5% to 99% by weight of fatty acid esters of glycerol.

32. The candle of claim 21, wherein the mixture includes 5% to 75% by weight of free fatty acid and 25% to 95% by weight of fatty acid esters of glycerol.

33. The candle of claim 21, wherein the mixture includes 5% to 50% by weight of free fatty acid and 50% to 95% by weight of fatty acid esters of glycerol.

34. The candle of claim 21, wherein the mixture includes 5% to 25% by weight of free fatty acid and 75% to 95% by weight of fatty acid esters of glycerol.

35. A solid candle, comprising: a composition comprising a plant derived composition including triglycerides having fatty acid components with up to 3 double bonds and at least one petroleum wax, the composition including a greater amount of the plant derived composition than the at least one petroleum wax.

36. The solid candle of claim 35, wherein the composition includes at least 51% by weight of the plant derived composition.

37. The solid candle of claim 36, wherein the composition includes at least 55% by weight of the plant derived composition.

38. The solid candle of claim 37, wherein the composition includes at least 65% by weight of the plant derived composition.

39. The solid candle of claim 38, wherein the composition includes at least 75% by weight of the plant derived composition.

40. The solid candle of claim 39, wherein the composition includes at least 83% by weight of the plant derived composition.

41. The solid candle of claim 5, wherein the fatty acid components of the vegetable-derived triglycerides includes up to about 74% stearic acid.

42. The solid candle of claim 5, wherein the fatty acid components of the vegetable-derived triglycerides includes up to about 73% oleic acid.

43. The solid candle of claim 5, wherein the fatty acid components of the vegetable-derived triglycerides includes up to about 39% palmitic acid.

44. The solid candle of claim 5, wherein the fatty acid components of the vegetable-derived triglycerides includes up to 33.91% linoleic acid.

45. The solid candle of claim 35, wherein the composition includes at least 3% by weight of the at least one petroleum wax.

46. The solid candle of claim 35, wherein the composition includes up to about 49% by weight of the at least one petroleum wax.

47. The solid candle of claim 35, wherein the fatty acid components of the triglycerides includes up to about 74% stearic acid.

48. The solid candle of claim 35, wherein the fatty acid components of the triglycerides includes up to about 73% oleic acid.

49. The solid candle of claim 35, wherein the fatty acid components of the triglycerides includes up to about 39% palmitic acid.

50. The solid candle of claim 35, wherein the fatty acid components of the triglycerides includes up to 33.91% linoleic acid.

51. The solid candle of claim 47, wherein the composition includes up to about 49% by weight of the at least one petroleum wax.

52. The solid candle of claim 48, wherein the composition includes up to about 49% by weight of the at least one petroleum wax.

53. The solid candle of claim 49, wherein the composition includes up to about 49% by weight of the at least one petroleum wax.

54. The solid candle of claim 50, wherein the composition includes up to about 49% by weight of the at least one petroleum wax.

* * * * *